United States Patent

[11] 3,634,870

| [72] | Inventor | Gordon R. Kessler<br>Stamford, Conn. |
|---|---|---|
| [21] | Appl. No. | 16,119 |
| [22] | Filed | Mar. 3, 1970 |
| [45] | Patented | Jan. 11, 1972 |
| [73] | Assignee | The Machlett Laboratories, Incorporated<br>Springdale, Conn. |

[54] ROTATING ANODE FOR X-RAY GENERATOR
3 Claims, 4 Drawing Figs.

[52] U.S. Cl. .................................................. 313/60,
313/149
[51] Int. Cl. .................................................. H01j 35/10
[50] Field of Search ........................................... 313/55, 60,
146, 149, 152, 330

[56] References Cited
UNITED STATES PATENTS

| 3,502,926 | 3/1970 | Takano ....................... | 313/60 |
| 2,648,025 | 8/1952 | Agule .......................... | 313/60 |

FOREIGN PATENTS

| 1,059,118 | 6/1959 | Germany...................... | 313/60 |
| 646,274 | 11/1950 | Great Britain................ | 313/60 |

*Primary Examiner*—Roy Lake
*Assistant Examiner*—Darwin R. Hostetter
*Attorneys*—Harold A. Murphy and Joseph D. Pannone

ABSTRACT: An X-ray tube having a rotating anode which is mounted on a bearing structure by means which minimizes the amount of heat which passes from the anode target to the bearings and which includes novel means for compensating for thermal expansion.

PATENTED JAN 11 1972 3,634,870

INVENTOR
GORDON R. KESSLER
BY
AGENT

ROTATING ANODE FOR X-RAY GENERATOR

BACKGROUND OF THE INVENTION

In X-ray tubes of the rotating anode type, a common problem has been that of bearing failure caused by heat which is conducted or radiated from the anode target. Such heat causes both axial and radial expansions of the anode structure. The prior art has attempted to employ angular contact bearings with a helical coiled spring between the bearings to position and preload the bearings. However, a major problem in designs of this type is that very often the spring hangs up or galls into the supporting structure, causing catastrophic rotational failures. This occurs due to the large sliding frictional forces in a vacuum.

Previous attempts to correct the situation have dealt with attempts to minimize the undesirable effects of sliding by applying some sort of lubricant to the areas in contact. The bearings usually employ rolling elements such as balls, and either the balls or the ball races, or both, may be lubricated with solid films of low vapor pressure materials, such as silver for example, for use in a vacuum of $10^{-6}$ torr at temperatures up to 500° C., for example.

SUMMARY OF THE INVENTION

The present invention has resulted in part from an attempt to solve the above-discussed problem at its source by, first, providing a novel construction which minimizes the conductive heat flow into the bearings by the use of a supporting structure between the bearings and target which is of small cross-sectional area to provide a thermal barrier which forces some of the heat to flow in a direction away from the bearings. Secondly, there is provided a spring design which allows thermal expansions and contractions with no sliding friction as in prior devices of this character. The spring is a hollow metal cylinder which has a helical slot extending from one end for a number of turns so that a portion of the cylinder is solid while the slotted portion is resilient.

BRIEF DESCRIPTION OF THE DRAWING

Referring more particularly to the drawing wherein like characters of reference designate like parts throughout the several views.

DESCRIPTION OF THE PREFERRED EMBODIMENT

Figure 1:
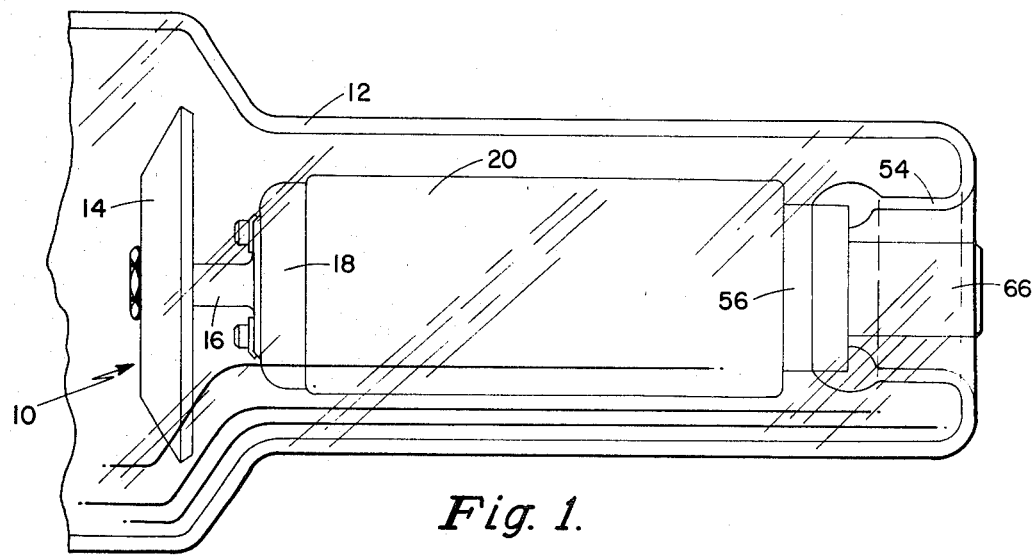
FIG. 1 is an elevational view of a portion of an X-ray tube of the rotating anode type.

To illustrate the invention, there is shown in FIG. 1 a portion of an X-ray tube or generator 10 comprising a rotating anode 10 supported within a sealed envelope 12 of glass or other selected material. The anode 10 includes a target 14 which is bombarded by electrons from a cathode (not shown) as in the normal operation of a tube of this type for the generation of X-rays which pass from the target out of the tube through the envelope. The cathode structure and the means for applying a suitable potential between the anode and cathode may take any form as is well known in the art and, therefore, are not described in detail herein.

Figure 2:
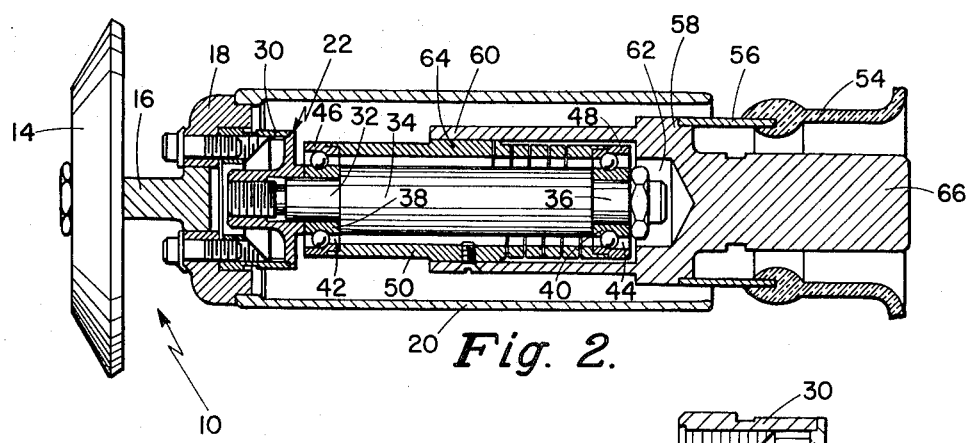
FIG. 2 is an enlarged axial sectional view of the rotating anode structure within the tube of FIG. 1.

The target 14 is preferably a disc of selected material such as tungsten, rhenium-coated molybdenum or the like which is mounted on one end of a molybdenum shaft 16, the opposite end of the shaft 14 being fixed as by brazing within an encircling metal collar or ring 18. A rotor skirt 20 is sealed at one end by a relatively broad area braze to the collar 18 as shown in FIG. 2 and extends therefrom axially of the tube in a direction away from the target.

Figure 4:
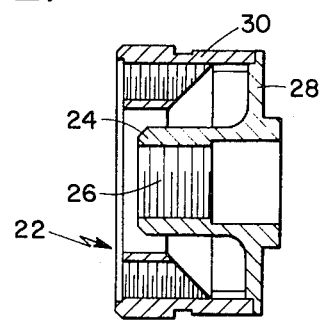
FIG. 4 is an enlarged axial sectional view of the pan head which connects the target shaft and collar to the bearing structure.

The collar 18 also carries a head 22 of unique shape which provides a thermal dam for the purpose of causing most of the heat generated by the target when bombarded by electrons from flowing into the bearing structure to be described. The head 22 comprises a central portion 24 (FIG. 4) which has an axial threaded bore 26 therein and a radial flange 28 which is relatively thin and to which is fixed one end of a ring portion 30 which extends therefrom toward the collar 18. The opposite end of the ring 30 is bolted or screwed to the collar 18 and for this purpose is made necessarily thick at this end, but tapers to relative thinness at the end which is joined to flange 28.

Figure 3:
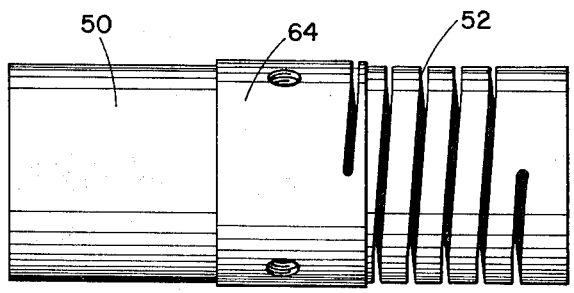
FIG. 3 is an enlarged elevational view of the spring cylinder shown in the structure illustrated in FIG. 2.

One end portion 32 of a bearing shaft 34 is of reduced diameter and is threadedly mounted in the bore 26 of the central portion 24 of head 22. Shaft 34 extends axially of the tube and has an opposite end portion 36 which is also of reduced size, each reduced end portion 32 and 36 respectively carrying thereon a fixed inner race 38 and 40 of a respective bearing 42 and 44. The outer races 46 and 48 of the bearings are spaced by a novel spacer member 50 which is shown in detail in FIG. 3.

Member 50 is a hollow metal cylinder which is provided with a spiral slot 52 extending from one end for a selected distance so as to create a spring portion whereby the bearing races 46 and 48 are constantly yieldably urged away from one another. With a structure of this sort it will be apparent that any thermal expansion of the shaft 34 will cause the spacing between the inner races of the bearings to increase. However, as this occurs, the member 50 will, through elongation of the springlike portion, permit the bearings to be located for proper functioning without binding and without galling or hanging up of the spring in its supporting structure.

The entire anode structure 10, including the rotor mechanism, is supported on a reentrant portion 54 of the tube envelope 12 which is sealed by a kovar ring 56 which is sealed at one end to envelope portion 54 and at its opposite end to a metal shank 58. One end portion 60 of shank 58 extends within the rotor skirt 20 in spaced relation therewith and is provided with an internal bore 62 for receiving the adjacent end of bearing shaft 34. Member 50 is provided with a centrally disposed thickened portion 64 which closely interfits within the bore of shank portion 60 and means such as screws are utilized to secure the member to the shank. Thus, the shank and member are held immobile as well as the outer races 46-48 of the bearings 41-44 which interfit with the ends of the spacer member for accuracy of alignment.

The opposite end portion 66 of the shank is solid and extends out of the envelope through reentrant portion 54 for providing an anode terminal for connection to an external power source.

It will be apparent that most of the heat from the target 14 which flows into shaft 16 will pass through collar 18 into the skirt 20. The ring portion 30 of head 22 and the flange 28 to which portion 30 is secured are both made relatively thin to provide a minimal area for conductive heat transfer through the head to the bearing structure.

It will be understood from the foregoing description that heat generated by the target 14 will flow through shaft 16 into collar 18. However, the small cross-sectional area of the ring 30 and of the flange 28 of head 22 will permit only relatively small amounts of heat to pass from the collar into the bearings and bearing shaft. Most of this heat will flow directly into the skirt 20 where it will not cause serious problems.

The little heat which does pass into the bearings, however, is minimal. However, this heat and heat generated by the bearings themselves during rotation will be efficiently compensated for by the angular contact bearing structure and by the spring cylinder 50.

While the operational frequencies for most tubes of this character are between approximately 3,600 and 10,800 r.p.m., the presently described tube operates efficiently between 1,000 and 12,000 r.p.m. With respect to vibration, while many prior tube designs broke at the shank end of the anode structure because of extreme vibrations which were transmitted to the glass envelope, it has been found that the spring device 50 acts as an energy absorber which considerably dampens the vibrations and thus prevents damage to the envelope.

Furthermore, with an anode support structure of the presently described type, there is assured a dynamically stable rotor with little or no effect from centrifugal forces.

It will be apparent that all of the objectives of this invention have been achieved by the structure shown and described. Various modifications and changes, however, may be made by those skilled in the art without departing from the spirit of the invention as expressed in the accompanying claims. Therefore, all matter shown and described is to be interpreted as illustrative and not in a limiting sense.

I claim:

1. An anode structure for X-ray tubes, comprising a rotatably shaft, a target mounted for rotation with said shaft, supporting means to which the target is fixed, a head connecting said means to the shaft, the head having a portion thereof which is small in cross-sectional area compared to said means whereby large amounts of heat are prevented from flowing from the means into the shaft, a pair of bearings having inner and outer races and mounted by their inner races at spaced locations on the shaft, and spring means encircling the shaft and abutting respective outer races at each end, said spring means comprising a metal tubing having a helical slot therein extending from one end for a number of turns for yieldably urging said outer races in opposite directions.

2. An X-ray generator comprising a sealed envelope, an anode structure supported for rotation within the envelope, and a fixed shank connecting the anode structure to the envelope, said anode structure comprising a rotatable shaft, a target mounted for rotation with said shaft, supporting means to which the target is fixed, and a head connecting said means to the shaft, a pair of bearings having inner and outer races and mounted by their inner races at spaced locations on the shaft, and spring means encircling the shaft and abutting respective outer races at each end, said spring means comprising a metal tubing having a helical slot therein extending from one end for a number of turns for yieldably urging said outer races in opposite directions.

3. An X-ray generator comprising a sealed envelope, an anode structure supported for rotation within the envelope, and a fixed shank connecting the anode structure to the envelope, said anode structure comprising a rotatable shaft, a target mounted for rotation with said shaft, supporting means to which the target is fixed, and a head connecting said means to the shaft, the head having a portion thereof which is small in cross-sectional area compared to said means whereby large amounts of heat are prevented from flowing from the means into the shaft, a pair of bearings having inner and outer races and mounted by their inner races at spaced locations on the shaft, and spring means encircling the shaft and abutting respective outer races at each end, said spring means comprising a metal tubing having a helical slot therein extending from one end for a number of turns for yieldably urging said outer races in opposite directions.

* * * * *

UNITED STATES PATENT OFFICE
CERTIFICATE OF CORRECTION

Patent No. 3,634,870   Dated January 11, 1972

Inventor(s) Gordon R. Kessler

It is certified that error appears in the above-identified patent and that said Letters Patent are hereby corrected as shown below:

Column 2, line 45, change "41" to -42-

Column 3, line 18, change "rotatably" to -- rotatable --

Please add following Claim 4:

-- 4. An anode structure for X-ray tubes, comprising a rotatable shaft, a target mounted for rotation with said shaft, supporting means to which the target is fixed, a head connecting said means to the shaft, a pair of bearings having inner and outer races and mounted by their inner races at spaced locations on the shaft, and spring means encircling the shaft and abutting respective outer races at each end, said spring means comprising a metal tubing having a helical slot therein extending from one end for a number of turns for yieldably urging said outer races in opposite directions.--

On the title page [54] "3 Claims, 4 Drawing Figs." should read -- 4 Claims, 4 Drawing Figs. --.

Signed and sealed this 18th day of July 1972.

(SEAL)
Attest:

EDWARD M. FLETCHER, JR.
Attesting Officer

ROBERT GOTTSCHALK
Commissioner of Patents

FORM PO-1050 (10-69)